Feb. 9, 1943. G. P. GROVER 2,310,850
CAMERA
Filed June 16, 1941 3 Sheets-Sheet 1

Inventor
Garrison P. Grover
By Caswell & Hagaard
Attorneys

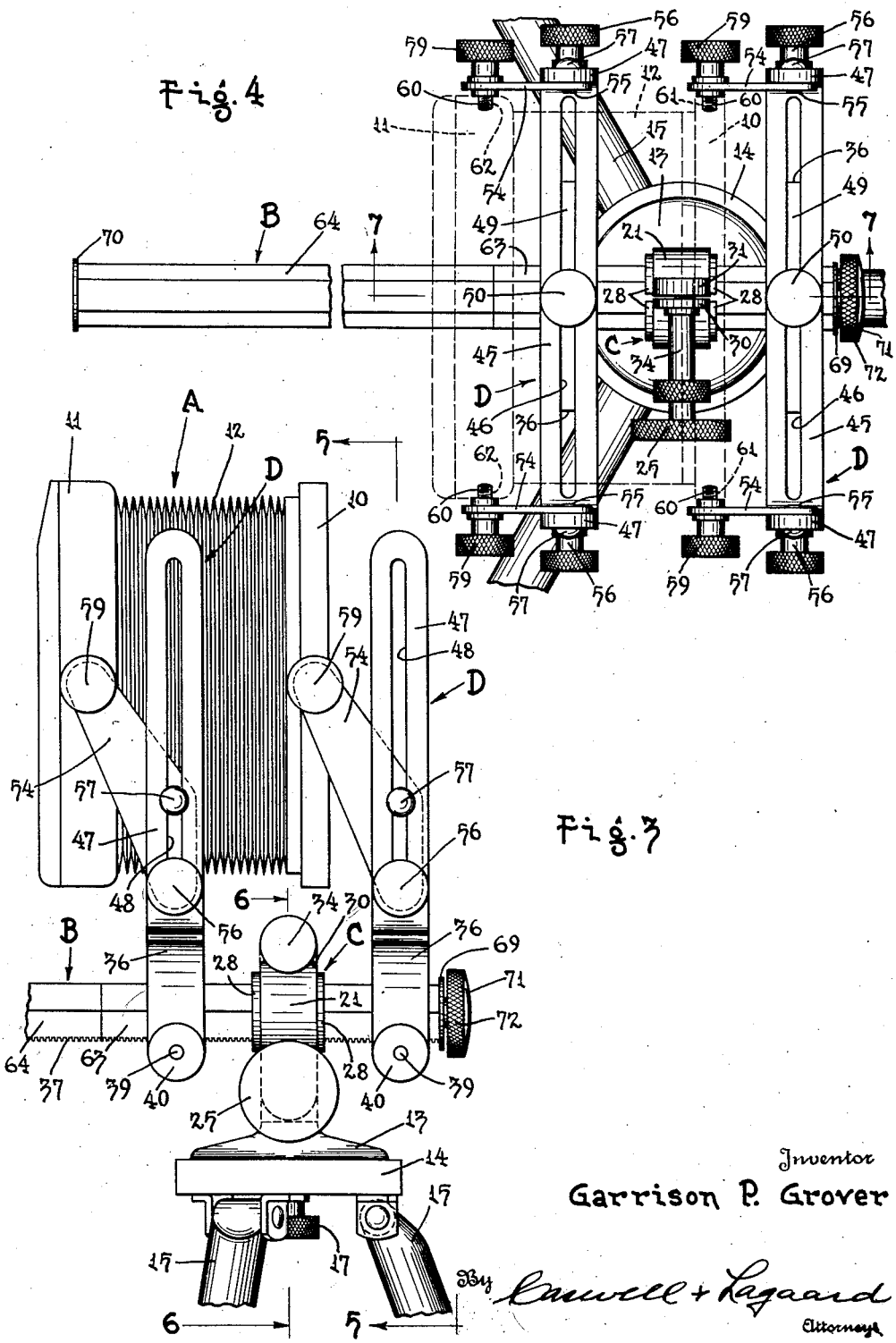

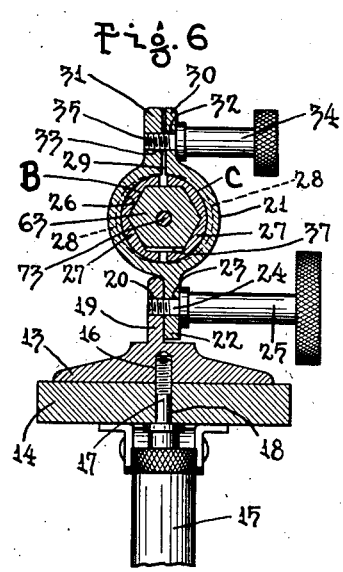

Patented Feb. 9, 1943

2,310,850

UNITED STATES PATENT OFFICE 2,310,850

CAMERA

Garrison P. Grover, Minneapolis, Minn., assignor to Burke & James, Inc., a corporation of Illinois Application June 16, 1941, Serial No. 398,273

19 Claims. (Cl. 95—50)

My invention relates to improvements in photographic cameras, an object thereof being to provide a bellows camera of great versatility that is simple, durable, relatively inexpensive and readily adjustable through wide ranges to meet the varied and exacting requirements of photographers, especially those engaged in commercial photography, a further object of the invention being to provide a camera of the present character that is capable of long extension and yet capable of taking compact form under certain uses and for facilitating the packing and storage thereof.

Another and more specific object of the invention is to provide a bellows camera with a lens-carrying front, and a plate-carrying back, each having independent adjustments fully complementing those of the other, a further object being to provide such a camera, wherein adjustments for the camera front and back are provided in similar supporting structures therefor, whereby opposite adjustments, through similar parts of said structures serve to multiply the effective displacement procurable through a single supporting structure.

An additional object of my invention is to supply a bellows camera, as above, in which said similar supporting structures for producing said adjustments are carried by a bed rail and are independently reversible to afford adidtional adjustments by varying the spacing between the front of the camera and the back thereof and by varying the disposition of the camera body lengthwise of the bed rail.

Other objects of the invention reside in the novel combination and arrangement of parts and in the details of construction hereinafter illustrated and/or described.

Figure 1:
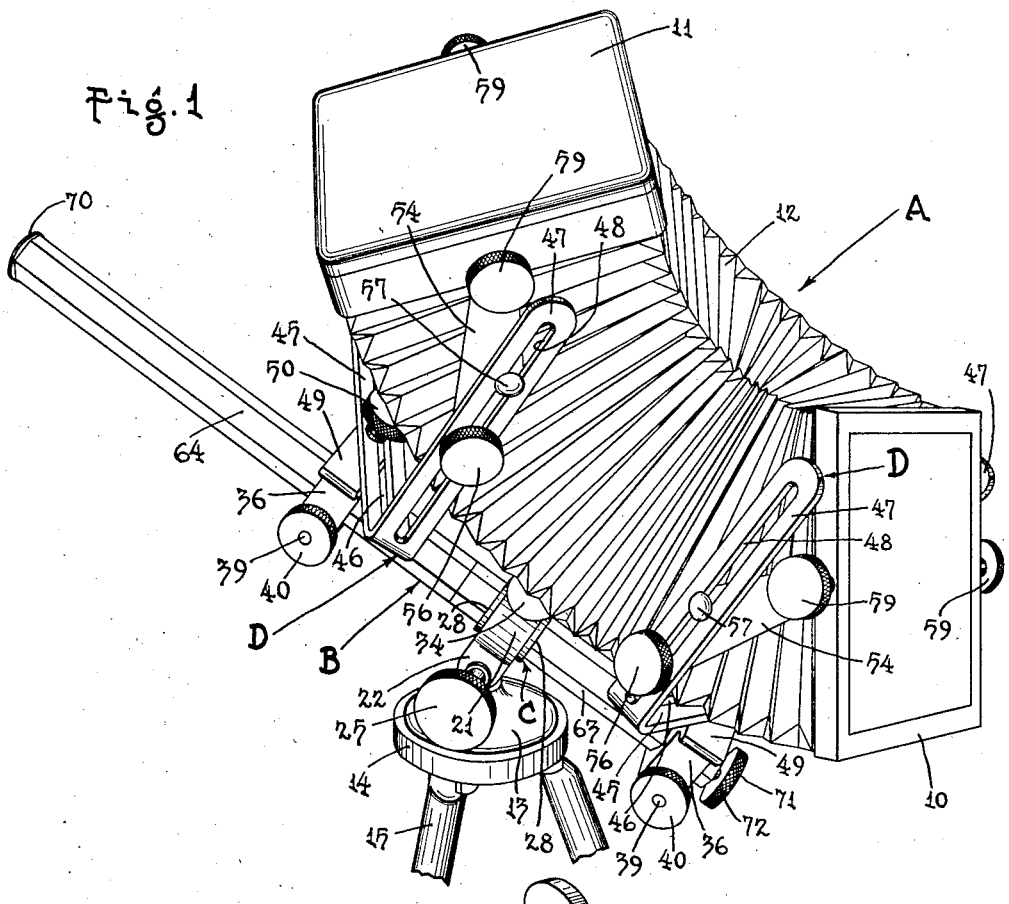
Figure 2:
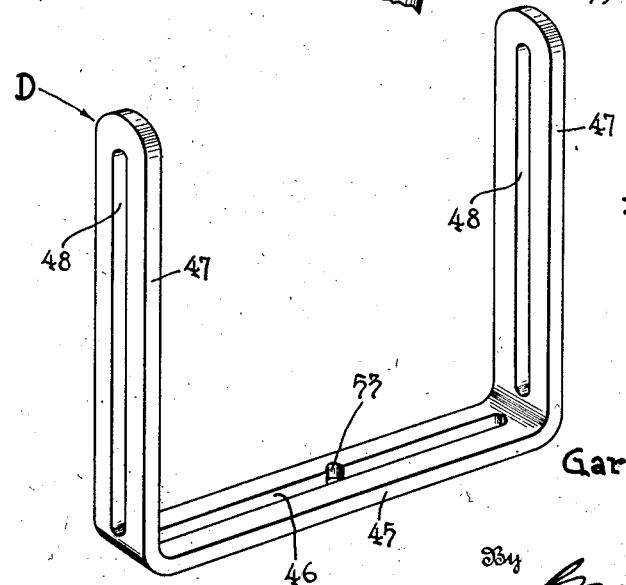

In the accompanying drawings, Fig. 1 is a perspective view of a camera embodying my present invention, said camera being shown as mounted on the platform of a tripod; Fig. 2 is a perspective view in detail of one of the duplicate supporting elements of the mounting structure for the extensible and collapsible camera body; Fig. 3 is a side elevational view of the camera illustrated in Fig. 1, the parts thereof occupying adjustments differing from those shown in said Fig. 1; Fig. 4 is a plan view of the structure illustrated in Fig. 3, the camera body being outlined in dotted lines; Fig. 5 is a vertical sectional view taken as on the line 5—5 of Fig. 3; Fig. 6 is a vertical sectional view taken as on the line 6—6 of Fig. 3; Fig. 7 is a vertical sectional view taken as on the line 7—7 of Fig. 4.

Referring to the drawings wherein similar parts are designated by similar reference characters throughout the several views, it will be observed that the illustrated embodiment of my invention includes a camera body A consisting of a front 10, back 11 and a bellows 12. The camera front 10 comprises a rectangular end member in which a lens (not shown) is centrally carried in conventional or any suitable manner. The camera back 11 also comprises a rectangular end member which carries a photographic plate (not shown) in conventional or any suitable manner, said back 11 being of substantially the same dimensions as said front 10 and like said front constituting, specifically, no part of my present invention. The bellows 12 is of uniform rectangular cross-section from end to end thereof and is interposed between said front 10 and back 11 connecting the one to the other in the usual manner.

The mounting structure for the camera body A includes a base-plate 13 adapted to rest upon a platform 14 of a tripod 15, said base-plate 13 having a central threaded bore 16 therein to receive a binding screw 17 extending upwardly through a bore 18 in said platform 14, the provision of said binding screw 17 providing for detachably clamping the base plate 13 to the tripod platform 14 in any desired angular relationship of the one with respect to the other. Said base plate 13 is provided with an upstanding attaching lug 19 formed with a threaded bore 20 transversely thereof for a purpose soon to appear. Included in the mounting structure for the camera body A is a bed-rail B, hexagonal in cross-section, upon which the camera front 10 and camera back 11 are independently mounted and which, in turn, is connected with and carried on the base plate 13. Embodied in the connection between said bed rail B and base plate 13 is a clamping sleeve 21 receiving said rail, said sleeve 21 having a depending lug 22 thereon formed with a smooth bore 23 therein. This bore loosely receives the threaded shank 24 of a binding screw 25 which is threaded into the threaded bore 20 of the lug 19 on said base plate 13, the provision of said binding screw 25 serving to afford such forward and backward tilted adjustments of the sleeve 21 relative to the base plate 13 as may be desired. The bore 26 of the sleeve 21 which receives the hexagonal bed rail B is cylindrical and of greater diameter than the greatest cross-sectional dimension of said bed rail, an adapter C being provided to fit about the rail B and within said bore 26. This adapter C consists of two sections 27 each of slightly less than full semi-cylindrical extent. These sections 27 have end-flanges 28 thereon which engage the ends of the mounting sleeve 21 and deprive said sections 27 of endwise movement relative to said sleeve. Said end-flanges 28 are made in crescent-like form, as indicated in dotted lines in Fig. 6, to admit of the endwise insertion of the adapter sections 27 into the sleeve 21, prior to the insertion of the bed rail B into the adapter C. A slit 29 splits the mounting sleeve 21 lengthwise along the top thereof, said sleeve being formed with lugs 30, 31 at opposite sides of said slit, the lug 30 having a smooth bore 32 therein and lug 31 having a threaded bore 33 therein registering with said smooth bore 32. A binding screw 34, the shank 35 of which extends through said smooth bore 32 and is threaded in said threaded bore 33, releasably clamps the split sleeve 21 about the adapter C and, in turn, clamps the sections 27 of said adapter about the bed rail B with the result that said bed rail may be shifted along the sleeve 21 and turned on its axis within said sleeve, as may be desired.

Slidably mounted on the bed rail B are two identical bed blocks 36, each formed with an opening therethrough of hexagonal formation snugly receiving said bed rail B. These bed blocks 36, together with frames thereon more fully hereinafter described, comprise front and back supports for the camera front 10 and camera back 11 respectively.

The lower side of said bed rail B is toothed to form a rack 37 and each bed block 36 is supplied with a pinion 38 meshing with said rack 37 and serving to shift the block 36 along the bed rail B and serving also to secure said block relative to said rail in the various adjusted positions of the block on said rail. Referring to the illustration of either of said bed blocks 36, it will be seen that the pinion 38 is secured to a pinion shaft 39 intermediately thereof and that said shaft 39 has a knob 40 fastened to one of its ends for turning the shaft, the opposite end of said shaft 39 being threaded. Mounted on the pinion shaft 39 between the knob 40 and pinion 38 is a shouldered bushing or journal 41. The pinion shaft 39, pinion 38 and bushing 41 are accommodated within a bore 42 in the bed block 36, said bore being reduced, as at 43, to journal the threaded end of the pinion shaft 39 which extends beyond the side of said block 36 opposite the side thereof at which the knob 40 is accessible. A binding nut 44 fitted to said threaded end of the pinion shaft 39 and adapted to be turned against the block 36 releasably secures said pinion shaft 39 against rotation in said block 36.

Identical U-frames D are provided for the identical bed blocks 36, one of said frames being mounted on each of said blocks. This U-frame construction is of bar-like formation. It includes a base bar 45 having a slot 46 therein substantially from end to end thereof and further includes upright branches 47 each slotted, as at 48, substantially throughout its entire length. The upper portion of each bed block 36 forms a platform 49 upon which the base bar 45 of the U-frame D for said block is slidably and swivelingly supported, a connection between said base bar 45 and platform 49 being effected through a binding screw 50 having a shank 51 in the slot 46 in the base bar 45, said shank being threaded into a threaded bore 52 in said platform. One of the walls of the slot 46 in the base bar 45 is recessed to provide a notch 53 (Figs. 2, 7) in which the shank 51 of the binding screw 50 may be caught. This notch 53 is centrally disposed between the ends of said base bar 45 and, upon being caught about the shank 51 of the binding screw 50, centers the U-frame D on its bed block 36. With the U-frame D thus centered, it is free to swivel on the platform 49 of the bed block 36, but is held against sliding thereon lengthwise of the base bar 45, such sliding movement being admitted upon shifting the U-frame laterally of said base bar to disengage the centering notch 53 from the shank 51 of the binding screw 50. Each upright branch 47 of each U-frame D is fitted with a vertically adjustable arm 54 which is offset at its upper portion edgewise of said branch. The arm 54, in each case, is slidably guided on its respective U-frame branch 47 by two pins, one a plain guide-pin 55 and the other a binding screw 56. The guide-pin 55, issuing outwardly from said arm 54, between the ends thereof, slidably fits in the slot 48 of the branch 47 and has a head 57 overreaching said slot and engaging the outer surface of said branch. The binding screw 56 had a threaded shank 58 slidably fitted in said slot 48 and threaded into the lower end of said arm 54, said screw 56 being adapted to be turned against the outer surface of said branch 47. Thus, the arm 54 may be raised and lowered on its respective U-frame branch 47 and secured relative thereto at the desired elevation by tightening said binding screw 56.

Journaled in the offset upper portion of each arm 54 is a binding screw 59 having a threaded shank 60. The side edges of the camera front 10 are provided with aligned threaded bores 61 (Fig. 4), the common axis thereof lying in a horizontal plane intersecting the axis of the lens carried by said front. These bores 61 receive the threaded shanks 60 of the two binding screws 59 carried by the two arms 54 on the front U-frame. Correspondingly, the side edges of the camera back 11 are provided with aligned threaded bores 62, the common axis thereof coinciding, approximately, with the horizontal axis of the plate carried by said back 11. Said threaded bores 62 receive the threaded shanks 60 of the binding screws 59 carried by the two arms 54 of the back frame D.

From the foregoing, it will be readily comprehended that the various mentioned adjustments afford versatility in my improved construction of the highest practical order, certain of the principal adjustments being as follows: The adjustments afforded through the medium of the binding screw 17, whereby the base plate 13 may be swiveled on the tripod platform 14 into positions pointing the camera at desired angles horizontally without turning the tripod itself; the adjustments afforded through the binding screw 25, whereby the rail-supporting sleeve 21 may be tilted forwardly and backwardly to point the camera at desired angles vertically; the adjustments afforded through the binding screw 34, whereby the bed rail B may be shifted lengthwise and angularly relative to the rail sleeve 21 to balance the camera on the tripod; the adjustments afforded by the related manipulation of the binding nuts 44 and turning knobs 40 on the pinion shafts 39 in the two bed blocks 36, whereby the camera may be extended or collapsed as desired; the adjustments afforded by the binding screws 50, whereby the U-frames D may be swiveled on the bed blocks 36 about the axes of said screws independently to swing the camera front 10 and the camera back 11 about said axes, and whereby said U-frames may be slid on said bed blocks 36 independently to shift said front 10 and said back 11 sidewise relative to its respective bed block; the adjustments afforded by the binding screws 56 in the arms 54, whereby the camera front 10 and camera back 11 may be independently raised and lowered on their respective U-frames D, as may be desired, and the adjustments afforded by the binding screws 59, whereby the front 10 and back 11 may be independently tilted forwardly and rearwardly relative to their respective supporting arms 54.

The two U-frames D may be similarly disposed angularly on their respective bed blocks 36 so that the two arms 54 of each frame are offset rearwardly therefrom. (Figs. 3, 7), or forwardly therefrom. Thus, without shifting the bed blocks 36 on the bed rail B and without changing the axial length of the camera body, said camera body may be supported on the bed rail in different positions lengthwise thereof. And, too, said U-frames D may be oppositely disposed angularly on their respective bed blocks 36 so that the arms 54 of one frame D are offset therefrom in a direction opposite to that in which the arms 54 of the other frame D are offset (Fig. 1). Thus, without shifting the bed blocks 36 on the bed rail B, the camera body may be lengthened or shortened and the front 10 and back 11 thereof disposed in different positions relative to the bed rail B lengthwise thereof.

The bed rail B consists of two separable sections, one a head section 63 and the other a tail section 64, the former having a socket 65 therein and the latter being formed with a boss 66 adapted to be received in said socket. To align the corresponding faces of the hexagonal bed rail sections 63, 64, the tail section 64 is provided with a dowel pin 67 which is received in a bore 68 in the head section 63. An end stop 69 for the front bed block 36 consists of a circular plate fastened by screws to the front end of the head section 63 of the bed rail B, and an end stop 70 for the rear bed block 36 consists of a similar circular plate fastened by screws to the rear end of the tail section 64 of the bed rail B. To secure the bed rail sections 63, 64 together in their socketed relationship, I provide a tie-screw 71 having a knurled head 72, and a long shank 73 formed with threads 74 at its end portion. The head section 63 of the bed rail B has an axial bore 75 which registers at its forward end with a central aperture in the end plate 69 on said section 63 and which communicates at its rear end with the socket 65 in said section 63. The shank 73 of the tie screw 71 is inserted through said end plate aperture and through said bore, the head 72 of said screw taking position against the face of said end plate 69 and the threaded portion 74 of said shank occupying a position within the socket 65 of said head section 63. Within this socket and upon said threaded portion 74 of said shank 73 is a nut 76. This nut is tightly turned to its limit of movement on the threaded portion 74 of the shank 73 and, thus locked upon said shank, keeps the tie-screw 71 from sliding out of the bed rail section 63 when the tail section 64 is detached therefrom. The boss 66 of said tail section 64 is formed with a threaded axial bore 77 into which the threaded portion 74 of the shank 73 is turned during the process of telescoping said boss into the socket 65 of the head section 63. With this telescoping process completed, the shoulder 78 on the tail section 64 at the butt of the boss 66 is firmly clamped against the end of the head section 63 by tightening the tie-screw 71. Thus, the sections 63, 64 of the bed rail B, when assembled, are rigidly held together end to end and, in effect, constitute an elongated unitary rail through the entire extent of which the bed blocks 36 are readily adjustable, it being understood, of course, that the toothed surfaces of the two rail sections form a continuous rack 37 for cooperation with the pinions 38 of the bed blocks 36. By unscrewing the tie-screw 71, the tail section 64 of the bed rail B is backed away from the head section 63 and finally disengaged from said screw, whereupon said tail section 64 is readily detached from said head section 63. Before separating the tail section 64 of the bed rail B from the head section 63, the rear bed block 36, as well as the front bed block 36, will be positioned upon said head section 63 (Figs. 3, 7) in order that the camera body A will have its entire support thereon. With the camera body thus supported on the foreshortened rail B and collapsed thereby, the structure is reduced to narrow confines and adapted to be conveniently and safely packed in a relatively small container, it being a simple matter to extend the rail B if and when subsequent demands therefor arise.

Having described in detail the construction of the illustrated embodiment of my invention, it will be readily appreciated that said invention is featured by universal adjustability providing a versatile view camera capable of meeting the varied and exacting requirements to which a device of the present type may be put; that through independent adjustments, long extension and compact folding of the camera body is afforded, together with indepenent swinging, sliding, tilting and elevating movements of the camera front and camera back; that said adjustments additionally provide for the tilting, swinging and sliding of the camera structure to facilitate pointing the camera and balancing the same on the tripod, and that the invention is readily susceptible of embodiment in a structure which is simple, durable, light in weight, relatively inexpensive and convenient in use.

Changes in the specific form of my invention, as herein disclosed, may be made within the scope of what is claimed without departing from the spirit of my invention.

Having described my invention, what I claim as new and desire to protect by Letters Patent is:

1. In a camera having a body comprising front and back members and a bellows therebetween, a base member, a bed rail longitudinally and angularly adjustable on said base member, supports, one for each of said camera members, said supports being mounted on said bed rail and each thereof being adjustable to alter the disposition of its respective camera member, relative to the bed rail, through rectilinear movements of such member, advancing, retracting, elevating, lowering, and sidewise shifting the same and, through swinging movements of such member, tilting the same and also swiveling it sidewise, and means individual to the said supports for centering them with respect to the bed rail.

2. In a bellows camera having a body comprising front and back members and a bellows therebetween, a base member including a base plate for swiveling attachment to the head of a tripod and further including a mounting sleeve tiltably supported on said base plate, a bed rail longitudinally slidable in said mounting sleeve and angularly adjustable therein, and supports, one for each of said camera members, both mounted on said bed rail and each thereof being independently shiftable longitudinally of the bed rail.

3. In a camera having a body comprising front and back members and a bellows therebetween, a base member, a bed rail longitudinally slidable on said base member, front and back supports for said front and back body members, respectively, said supports being carried by said bed rail, one of said supports including a bed block slidably mounted on the rail for movement therealong, said rail being toothed to form a rack, said bed block being provided with a pinion shaft having a pinion fixed thereto and meshing with said rack, the rotation of said pinion shaft operating adjustably to shift said bed block along said bed rail through the media of said pinion and rack, and a binding nut threaded on said pinion shaft and cooperating with said bed block releasably to secure the pinion shaft against rotation and thereby lock said bed block in selected positions of adjustment on the bed rail.

4. In a camera having a body comprising front and back members and a bellows therebetween, a base member, a bed rail longitudinally slidable on said base member, front and back supports for said front and back members, respectively, each support including a bed block slidably mounted on the rail for movement therealong, said rail being toothed to form a rack and having a detachable tail section, each bed block being provided with a pinion coacting with said rack and operable adjustably to shift the bed block along said bed rail, and means for securing such pinion against rotation to lock the bed block in selected positions of adjustment on said rail.

5. In a camera having a body comprising front and back members and a bellows therebetween, a base member, a bed rail longitudinally slidable on said base member, front and back supports for said front and back body members, respectively, each support including a bed block slidably mounted on the rail for movement therealong, said rail being toothed to form a rack and consisting of a head section and a tail section detachable from said head section, the bed block of the back support being provided with a pinion coacting with said rack and operable to shift said bed block of said back support along said sections of said bed rail and from one section thereof to other.

6. In a camera having a body comprising front and back members and a bellows therebetween, a base member, a bed rail longitudinally slidable on said base member, front and back supports for said front and back body members mounted upon and swingingly adjusted with respect to the base member, respectively, each support including a bed block slidably mounted on the rail for movement therealong, each bed block being provided with means cooperating with the bed rail adjustably to shift such block along said rail and secure the same in selected positions of adjustment thereon, and means for centering said supports with respect to the bed rail.

7. In a camera having a body comprising front and back members and a bellows therebetween, a bed rail toothed along one side thereof to form a rack, front and back supports for said front and back body members, respectively, said supports being slidably mounted on said rail and having means cooperating with the rack thereon for adjustably shifting the supports along the rail, said bed rail consisting of two separable sections normally disposed end-to-end, the mating ends of said sections being formed, one with a boss and the other with a socket to receive said boss, one section being provided with means cooperating with the other section to locate said sections angularly with respect to each other and to align the toothed portions of the two sections, one of said sections having a tie-screw journaled therein longitudinally thereof and threaded into the other section.

8. In a camera having a body comprising front and back members and a bellows therebetween, a bed rail having teeth along one side thereof forming a rack co-extensive therewith, front and back supports for said front and back body members, respectively, said supports being carried by said rail, one of said supports being slidably mounted on said rail and having means cooperating with the rack thereon for adjusting said support along the rail, said bed rail consisting of two separable sections, and means for tying said sections together end-to-end with the toothed portions thereof relatively aligned.

9. In a camera having a body comprising front and back members and a bellows therebetween, an oscillatable mounting sleeve, a bed rail of uniform cross-section longitudinally slidable in said sleeve, front and back supports for said front and back body members, respectively, said supports being slidably mounted on said rail for independent adjustment therealong, said bed rail consisting of two separable sections, means for tying said sections together end-to-end, and means for securing said sleeve against oscillating movement.

10. In a camera having front and back body members and a bellows therebetween, a bed rail, front and back supports for said front and back body members, respectively, said supports being carried by said bed rail, one of said supports including a bed block slidable on said rail and a U-frame having a base bar resting on said bed block and having upright branches supporting its respective body member, said base bar being formed with a slot therein longitudinally thereof, said slot having a branch transversely of the base bar intermediately of the same, and a binding screw comprising a head and a shank, the latter being threaded into the bed block and, in part, accommodated in said slot and receivable in said branch thereof to center the U-frame on said block, the head of said screw releasably engaging the base bar and adjustably clamping it on the bed block.

11. In a camera having front and back body members and a bellows therebetween, a bed rail, front and back supports for said front and back body members, respectively, said supports being carried by said bed rail, one of said supports including a bed block slidable on said rail and a frame swivelly and slidably supported on said bed block, said frame having a guide to direct the centering thereof on said bed block.

12. In a camera having front and back body members and a bellows therebetween, a bed rail, front and back supports for said front and back body members, respectively, said supports being carried by said bed rail, one of said supports including a bed block slidable on said rail and a frame having a base bar resting on said bed block and having a swiveling, sliding, slot-and-screw connection with said bed block, said connection including guide means for directing the centering of the base bar on the bed block.

13. In a camera having front and back body members and a bellows therebetween, a split mounting sleeve having a split bushing revoluble therein, a bed rail longitudinally slidable in the bushing, means for releasably clamping the sleeve about said bushing and, in turn, clamping said bushing about said rail, front and back supports for said front and back body members, respectively, said supports being carried by said rail, one of said supports being slidable on the rail for adjustment therealong.

14. A camera having front and back body members and a bellows therebetween, front and back supports for said front and back body members, respectively, said supports being carried by said bed rail, one of said supports having a pair of upstanding branches and an arm for each branch, each branch being formed with a slot therein longitudinally thereof, each arm having a pair of pins slidably received in the slot of its respective branch, one of said pins being a binding screw for releasably clamping the arm in vertically adjusted positions relative to its supporting branch, said arms being similarly offset from their respective supporting branches and attachable reversely to the sides of their respective body member, said support being reversible to locate the offset arms in positions extending from their branches in either direction lengthwise of the rail and thus vary the disposition of the supported frame member relative to the rail lengthwise thereof.

15. A camera having front and back body members and a bellows therebetween, front and back supports for said front and back body members, respectively, said supports being carried by said bed rail, one of said supports having a pair of upstanding branches, arms on said branches similarly offset therefrom and attachable reversely to the sides of their respective body member, said support being reversible to locate the offset arms in positions extending from their branches in either direction lengthwise of the rail and thus vary the disposition of the supported frame member relative to the rail lengthwise thereof.

16. A camera having front and back body members and a bellows therebetween, front and back supports for said front and back body members, respectively, said supports being carried by said bed rail and each thereof having a pair of upstanding branches and arms on said branches similarly offset therefrom and attachable reversely to the sides of their respective body member, said supports being independently reversible to locate their respective offset arms in positions extending from their branches in either direction lengthwise of the rail and thus vary the disposition of their respective supported frame members relative to the rail lengthwise thereof.

17. A camera having a body comprising front and back members and a bellows therebetween, a base for the camera, means individual to said members mounting them upon said base for independent adjustment with respect to the base in a plurality of different angular positions, a support, means mounting said base upon said support for adjustment with respect thereto in a plurality of different directions, and means individual to the front and back members for centering them.

18. A camera having a body comprising front and back members and a bellows therebetween, a base for the camera, means individual to said members mounting them for independent universal adjustment with respect to the base, a support, means mounting said base upon said support for adjustment with respect thereto in more than two different directions, and means for centering said front and back members.

19. A camera having a body comprising front and back members and a bellows therebetween, a base for the camera, means individual to said members mounting them upon said base for independent universal adjustment with respect to the base, a support, means mounting said base upon said support for adjustment with respect thereto in more than two different directions and independently with respect to the adjustment of the camera with relation to said base, and means for centering said front and back members.

GARRISON P. GROVER.